United States Patent
Aggas et al.

(10) Patent No.: US 6,420,002 B1
(45) Date of Patent: Jul. 16, 2002

(54) VACUUM IG UNIT WITH SPACER/PILLAR GETTER

(75) Inventors: Steven L. Aggas, Pinckney; Vijayen S. Veerasamy, Farmington Hills, both of MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 09/376,321

(22) Filed: Aug. 18, 1999

(51) Int. Cl.$^7$ .............................. E06B 3/24; E04C 2/54; H05B 6/64

(52) U.S. Cl. .................. 428/34; 156/109; 156/272.2; 264/432; 264/490; 52/786.13

(58) Field of Search ................... 428/34, 120, 913; 156/107, 109, 272.2; 52/786.13; 427/457, 525, 550; 264/427, 432, 490

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |

(List continued on next page.)

FOREIGN PATENT DOCUMENTS

| | | |
|---|---|---|
| DE | 2520062 | 11/1976 |
| DE | 2951330 | 7/1981 |
| EP | 0047725 | 12/1985 |
| EP | 0 421 239 | 4/1991 |
| EP | 0489042 | 6/1992 |
| EP | 0645516 | 3/1995 |
| FR | 7424197 | 9/1973 |
| FR | 8012696 | 6/1980 |
| FR | 2 482 161 | 11/1981 |

OTHER PUBLICATIONS

PCT International Search Report.

"Thermal Outgassing of Vacuum Glazing" by Lenzen, et. al., School of Physics, Univ. of Sydney, Australia.

"Fabrication of Evacuated Glazing at Low Temperature" by Griffiths, et. al., Solar Energy, vol. 63, No. 4, 243–249, 1998.

"Current Status of the Science and Technology of Vacuum Glazing" by Collins, et. al., Sch. of Physics, Univ. of Sydney, Australia, 1997.

"Temperature–Induced Stresses in Vacuum Glazing: Modelling and Experimental Validation" by Simko, et. al., Sch. of Physics, Univ. of Sydney, Australia, 1998.

*Primary Examiner*—Donald J. Loney
(74) *Attorney, Agent, or Firm*—Nixon & Vanderhye P.C.

(57) ABSTRACT

A vacuum insulating glass (IG) unit is provided with a plurality of spacers/pillars between opposing substrates. The spacers/pillars function (i) to support and space the substrates from one another, and (ii) as a getter to adsorb gas(es) located within the low pressure space between the substrates. Such spacers/pillars may be formed of one-piece getter inclusive material, or may be multi-piece including a getter coating.

20 Claims, 3 Drawing Sheets

U.S. PATENT DOCUMENTS

| | | |
|---|---|---|
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,514,450 A | 4/1985 | Nowobilski et al. |
| 4,683,154 A | 7/1987 | Benson et al. |
| 4,824,215 A | 4/1989 | Joseph et al. |
| 4,874,461 A | 10/1989 | Sato et al. |
| 4,924,243 A | 5/1990 | Sato et al. |
| 4,983,429 A | 1/1991 | Takayanagi et al. |
| 5,027,574 A | 7/1991 | Phillip |
| 5,091,233 A | 2/1992 | Kirby et al. |
| 5,124,185 A | 6/1992 | Kerr et al. |
| 5,154,582 A | 10/1992 | Danielson |
| 5,157,893 A | 10/1992 | Benson et al. |
| 5,234,738 A | 8/1993 | Wolf |
| 5,242,559 A | 9/1993 | Ciorgi |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,493,821 A | 2/1996 | Cohen et al. |
| 5,499,128 A | 3/1996 | Hasegawa et al. |
| 5,505,810 A | 4/1996 | Kirby et al. |
| 5,596,981 A | 1/1997 | Soucy |
| 5,632,122 A | 5/1997 | Spinks |
| 5,643,644 A | 7/1997 | Demars |
| 5,657,607 A | 8/1997 | Collins et al. |
| 5,664,395 A | 9/1997 | Collins et al. |
| 5,685,963 A | 11/1997 | Lorimer et al. |
| 5,712,529 A | 1/1998 | Ricaud et al. |
| 5,739,882 A | 4/1998 | Shimizu et al. |
| 5,814,241 A | 9/1998 | Reutova et al. |
| 5,827,048 A | 10/1998 | Tonegawa et al. |
| 5,855,638 A | 1/1999 | Demars |
| 5,866,978 A | 2/1999 | Jones et al. |
| 5,879,583 A | 3/1999 | Conte et al. |
| 5,882,727 A | 3/1999 | Corazza et al. |
| 5,888,925 A | 3/1999 | Smith et al. |
| 5,891,536 A | 4/1999 | Collins et al. |
| 5,897,927 A | 4/1999 | Tsai et al. |
| 5,902,652 A | 5/1999 | Collins et al. |
| 5,911,560 A | 6/1999 | Krueger et al. |
| 6,049,370 A | 4/2000 | Smith, Jr. et al. |

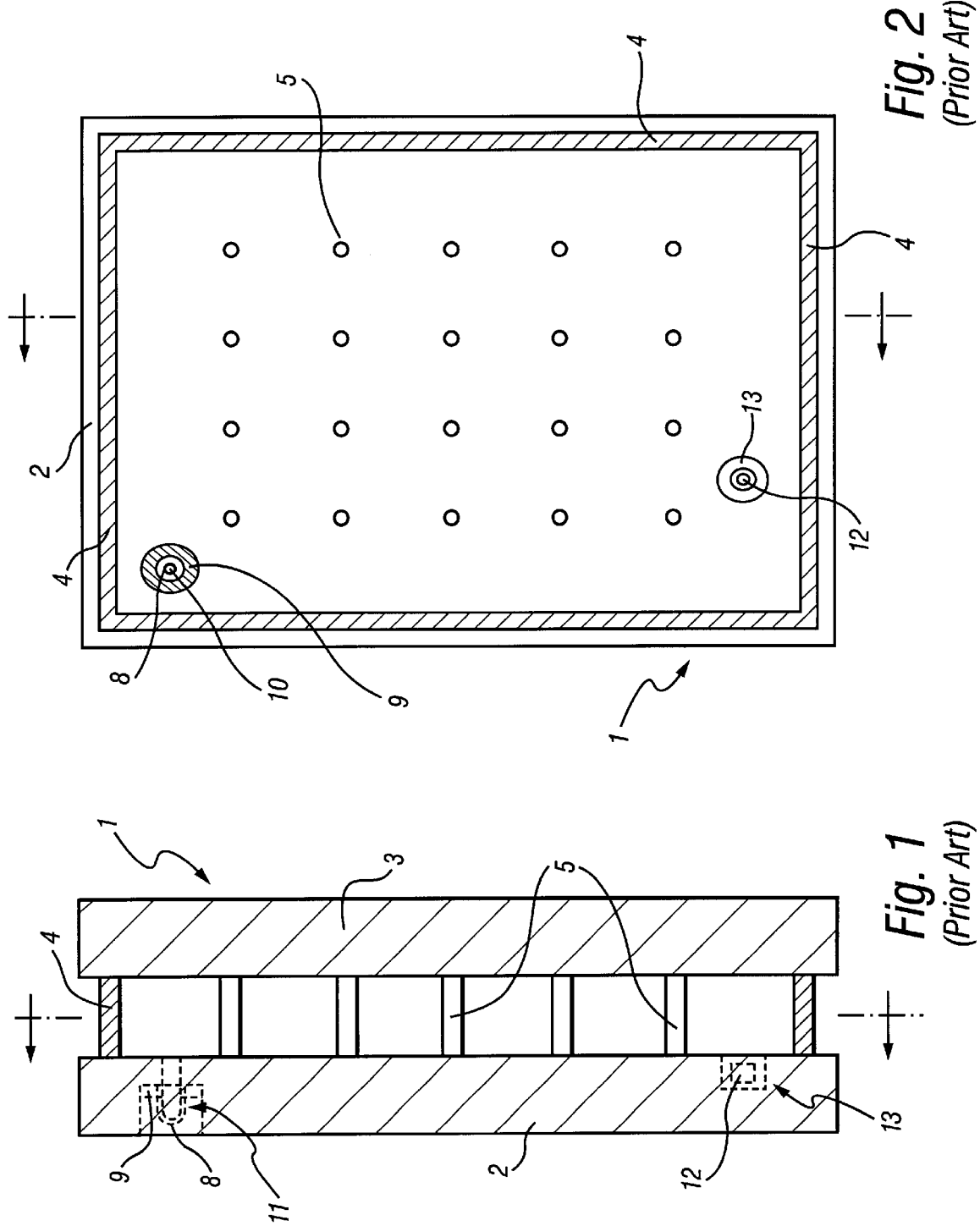

VACUUM IG UNIT WITH SPACER/PILLAR GETTER

RELATED APPLICATIONS

Commonly owned U.S. Ser. No. 09/303,550, entitled "VACUUM IG PILLAR WITH DLC COATING" and filed May 3, 1999 now U.S. Pat. No. 6,326,067, and Ser. No. 09/348,281, entitled PERIPHERAL SEAL FOR VACUUM IG UNIT and filed Jul. 7, 1999 pending, are both hereby incorporated herein by reference.

This invention relates to a vacuum insulating glass (IG) unit including at least one spacer/pillar with getter material(s), and a corresponding method of making the same.

BACKGROUND OF THE INVENTION

Vacuum IG units are known in the art. For example, see U.S. Pat. Nos. 4,683,154, 5,664,395, 5,657,607, 5,855,638, 5,891,536, and 5,902,652, the entire disclosures of which are all hereby incorporated herein by reference.

Prior art FIGS. 1–2 illustrate conventional vacuum IG unit 1. Unit 1 includes two spaced apart sheets of glass 2 and 3 which enclose an evacuated or low pressure space therebetween. Glass sheets 2 and 3 are interconnected by peripheral seal of fused solder 4 and an array of support spacers or pillars 5.

Pump out tube 8 is hermetically sealed by fused solder glass 9 to aperture 10 which passes from an interior surface of glass sheet 2 to the bottom of recess 11 in the exterior face of sheet 2. When sheets 2, 3 and peripheral/edge seal 4 are in place, prior to the tube being sealed, a vacuum is attached to tube 8 so that the interior cavity between sheets 2 and 3 can be vacuumed out or evacuated to create a low pressure area.

As shown in FIGS. 1–2, chemical getter 12 may be included within machined recess 13 in one of the glass sheets to counteract any rise in pressure due to out-gassing from the glass. Getters in vacuum IG units are also known as shown and/or described in U.S. Pat. Nos. 4,683,154, 5,124,185, and 5,657,607, the disclosures of which are incorporated herein by reference.

While conventional getters discussed above can function in a satisfactory manner in different environments, they may suffer from processing problem(s) and/or high manufacturing cost requirements. For example, the getter in the Benson '154 patent requires a separate metal plate-like structure between the sheets, which may not be considered aesthetically pleasing to some viewers. The getter of the Collins '607 patent requires machining a recess in one of the glass plates for getter placement.

It is apparent from the above, that there exists a need in the art for a vacuum IG unit having an improved getter(s), and corresponding method for making the same. There also exists a need in the art for a getter(s) inclusive vacuum IG unit that does not require machining of a recess into one of the glass sheets for getter mounting. There exists a further need in the art for a vacuum IG unit which includes a structure that functions as both a getter and as a spacer/pillar. It is a purpose of this invention to fulfill any or all of the above listed needs in the art.

This invention will now be described with respect to certain embodiments thereof, accompanied by certain illustrations.

SUMMARY OF THE INVENTION

An object of this invention is to provide a vacuum IG unit including an improved getter(s).

Another object of this invention is to provide a vacuum IG window unit that includes a spacer/pillar that also functions as a getter.

Another object of this invention is to provide a getter structure for a vacuum IG unit that does not require machining a recess into a glass sheet for separate getter mounting or placement.

Another object of this invention is to provide a method of making a getter/spacer (or getter/pillar) for a vacuum IG unit, the method including the step of applying a getter powder(s) onto a humidified spacer core and thereafter substantially melting the getter powder (e.g. using microwaves or some other form of energy) so that the getter material(s) diffuses into and/or adheres to the spacer core.

Another object of this invention is to provide a spacer/pillar for a vacuum IG unit, where the spacer/pillar is made of or comprises a getter material.

Another object of this invention is to fulfill any or all of the above-listed objects.

Generally speaking, this invention fulfills any or all of the above described needs in the art by providing a thermally insulating glass panel comprising:

first and second spaced apart glass substrates defining a low pressure space therebetween;

a seal interconnecting said first and second spaced apart glass substrates so as to hermetically seal said low pressure space between said substrates; and an array of getter inclusive spacers disposed in said low pressure space for maintaining separation of said first and second glass substrates.

This invention further fulfills any or all of the above described needs in the art by providing a method of maintaining vacuum in a low pressure space between first and second substrates, said method comprising the steps of:

providing a plurality of getter spacers in the low pressure space between the first and second substrates to support the substrates and space the substrates from one another; and the spacers adsorbing gas present in the low pressure space to maintain vacuum in the low pressure space.

IN THE DRAWINGS

FIG. 1 is a prior art cross-sectional view of a conventional vacuum IG unit.

FIG. 2 is a prior art top plan view of the FIG. 1 vacuum IG unit, taken along the section line illustrated in FIG. 1.

DETAILED DESCRIPTION OF CERTAIN EMBODIMENTS OF THIS INVENTION

Figure 3:
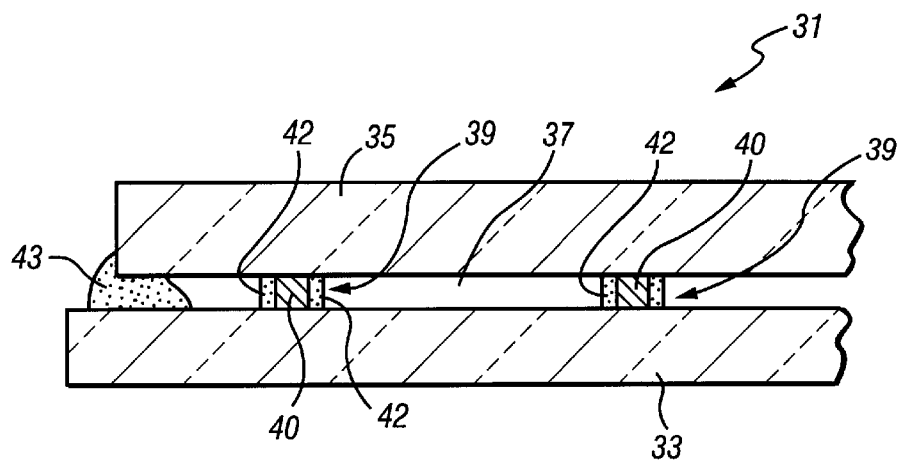
FIG. 3 is a side cross sectional view of a portion of a vacuum IG window unit according to an embodiment of this invention, where a single peripheral seal is provided.

Referring now more particularly to the accompanying drawings in which like reference numerals indicate like parts throughout the several views.

Certain embodiments of this invention relate to an improved spacer/pillar design for a vacuum insulating glass window unit, and a method of making the same. In certain embodiments a spacer/pillar may function: (i) to space opposing glass sheets from one another, and (ii) as a getter to remove outgassing from the low pressure space between the sheets which may interfere with the integrity of the vacuum. By utilizing an array of spacers/pillars that also function as getters, a separate getter is not needed although one may be used in certain embodiments.

FIG. 3 is a cross sectional view of thermally insulating glass panel 31 according to an embodiment of this invention. Because space 37 between the opposing substrates is at a pressure lower than atmospheric in general, this type of panel is often referred to as a vacuum insulating glass (IG) unit.

Referring to FIG. 3, vacuum IG unit or panel 31 includes first glass substrate 33, second glass substrate 35, low pressure or evacuated space 37 between substrates 33 and 35, spacers/pillars 39 for both (i) supporting and spacing the substrates 33, 35 from one another and (ii) acting as a getter, an optional pump out tube (not shown) disposed in a hole or aperture formed in substrate 33 for evacuating space 37, and peripheral or edge seal 43 that hermetically seals low pressure space or cavity 37 between substrates 33, 35. Hermetic edge seal 43, as shown in FIGS. 1–3, prevents air from entering space 37 and keeps the vacuum therein. Seal 43 is located in approximately the same peripheral location in the FIG. 3 embodiment as seal 4 shown in FIG. 2. Glass sheets 33 and 35 may be tempered or non-tempered in different embodiments. In alternative embodiments, substrates 33, 35 may be of plastic instead of glass. Substrates may be of any desirably shape (e.g. square, rectangular, round, triangular, flat, curved), although they are approximately parallel to one another in certain embodiments.

Figure 4:
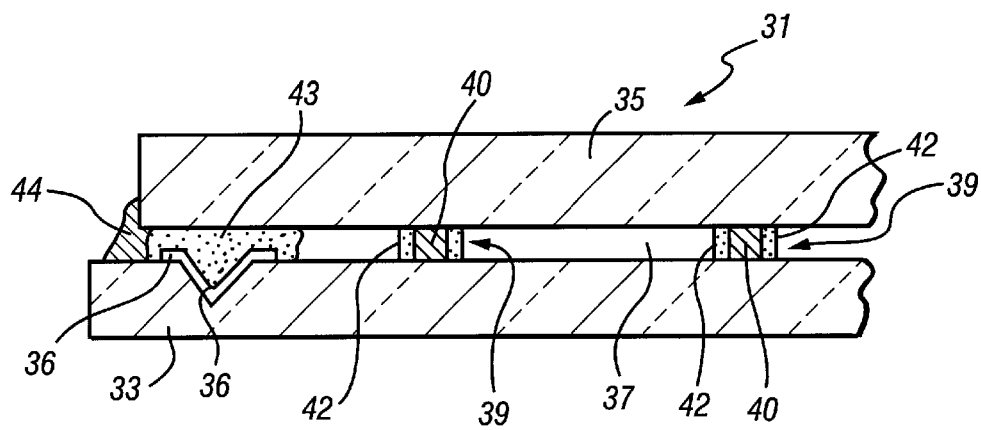
FIG. 4 is a side cross sectional view of a portion of a vacuum IG window unit according to another embodiment of this invention, where dual peripheral seals are provided.

The FIG. 4 vacuum IG embodiment is the same as the FIG. 3 embodiment, except that first 43 and second 44 peripheral edge seals are provided around the entire periphery of space 37. Also in the FIG. 4 embodiment, a notch or groove is formed around the periphery of sheet 33 with coating 36 thereover for reception of seal 43. Optional coating(s) 36 is provided over at least a portion of the groove to allow seal material 43 to better adhere to substrate 33. Coating 36 may be made of or include copper, chromium, silver, indium, ITO (indium tin oxide), or any combination thereof in different embodiments. Inner seal 43 may be of or include indium in certain embodiments, while outer seal 44 is of a suitable material (e.g. of or including butyl) to mechanically protect seal 43.

In certain embodiments of this invention, hermetic sealing material 43 may be obtained from Indium Corp. Of America, Utica, N.Y. For example, Indalloy Number 53 available from Indium Corp. in paste form has a composition of 67% Bi and 33% In (% by weight) for seal material 43. Indalloy Number 1 available from Indium Corp. in paste form has a composition of 50% In and 50% Sn. Indalloy Number 290 available from Indium Corp. in paste form has a composition of 97% In and 3% Ag. Indalloy Number 9 available from Indium Corp. in paste form has a composition of 70% Sn, 18% Pb and 12% In. Indalloy Number 281 available from Indium Corp. in paste form has a composition of 58% Bi and 42% Sn. Indalloy Number 206 available from Indium Corp. in paste form has a composition of 60% Pb and 40% In. Indalloy Number 227 available from Indium Corp. in paste or wire form has a composition of 77.2% Sn, 20% In and 2.8% Ag. Indalloy Number 2 available from Indium Corp. in paste or wire form has a composition of 80% In, 15% Pb and 5% Ag. Indalloy Number 4 available from Indium Corp. in paste or wire form has a composition of 100% In. Indalloy Number 205 available from Indium Corp. in paste or wire form has a composition of 60% In and 40% Pb. Indalloy Number 3 available from Indium Corp. in paste or wire form has a composition of 90% In and 10% Ag.

In each of the FIG. 3 and FIG. 4 embodiments, glass substrate 33 is slightly larger in surface area than glass substrate 35, so as to create an L-shaped step around the edge of the unit for supporting part of the edge seal. However, in alternative embodiments, substrates 33 and 35 may be approximately the same size. Also, while seal 43 includes an indium inclusive slurry or wire in certain embodiments, the edge seal may instead be of fused solder glass or other suitable material(s) in other embodiments.

Referring to FIGS. 3–4, IG units 31 according to different embodiments of this invention may be used as residential or commercial windows. The evacuation of space 37 eliminates heat transport between glass substrates 33 and 35 due to gaseous conduction and convection. In addition, radiative heat transport between glass sheets 33 and 35 can be reduced to a low level by providing a low emittance (low-E) coating (s) on the internal surface of one or both of sheets 33, 35. High levels of thermal insulation can thus be achieved. Low gaseous thermal conduction may be achieved when the pressure in space 37 is reduced to a level below about $10^{-2}$ Torr, more preferably below about 1.0 mTorr, or $10^{-3}$ Torr, and most preferably below about $10^{-6}$ Torr of atmospheric pressure. To maintain such low pressures, the internal surfaces of glass substrates 33 and 35 may be outgassed, and areas near the edges or peripheries of substrates 33, 35 are hermetically sealed together by seal 43, 44 that eliminates any ingress of gas or air.

An array of small, high strength support pillars 39 is provided between substrates 33 and 35 in order to maintain separation of the two glass sheets against atmospheric pressure. It is desirable for pillars 39 to be sufficiently small so that they are visibly unobtrusive.

Referring to FIGS. 3–4, each spacer/pillar 39 includes an inner core 40 (see also embodiments of FIGS. 5–6) of supporting material at least partially coated with getter coating 42. It is noted that the terms "pillars" and "spacer" are used interchangeably herein, and both mean an element disposed between and spacing the opposing substrates from one another (irrespective of the size or shape or make-up of the spacing element). Spacers 39 may be from about 0.05 to 1.0 mm in height in certain embodiments (most preferably from about 0.1 to 0.3 mm), and have a width or diameter of from about 0.05 to 1.0 mm.

In certain embodiments illustrated in FIGS. 3–6, central core 40 of each spacer 39 includes or is made of high strength metal, fused solder glass, ceramic, hardened tungsten, tantalum, molybdenum, high strength steel alloy (s), aluminum oxide, or zirconium dioxide (zirconium dioxide is not a getter material). In certain embodiments, core 40 is of a material having a mechanical compressive strength greater than about 750 Mpa.

In certain embodiments, getter coating 42 is non-evaporable and includes or is made of: zirconium-aluminum (Zr—Al; e.g. from about 80–86% Zr and from about 14–20% Al), zirconium-iron (Zr—Fe), zirconium-vanadium-titanium-iron (Zr—V—Ti—Fe), zirconium-vanadium-iron (i.e. Zr—V—Fe), Zr inclusive alloy, titanium (Ti) inclusive alloy, niobium (Nb) inclusive alloy, tantalum (Ta) inclusive alloy, vanadium (V) inclusive alloy, Zr—Al, Zr—V, Zr—Ni, or Zr—Mn—Fe. The materials listed above include substantially pure metallic elements of the metals and metallic alloys thereof. Other suitable non-evaporable metallic getter materials may also be used as coating 42. Also, any of the getter materials described in U.S. Pat. No. 5,879,583 or U.S. Pat. No. 5,888,925 may be used as a getter coating or core herein, the disclosures of these '583 and '925 patents hereby being incorporated herein by reference. A coating of Zr—V—Fe is preferred in certain embodiments as it is activatable at temperatures of from about 20–400° C., and can function as a getter at room temperature.

Figures 5, 6, 7:
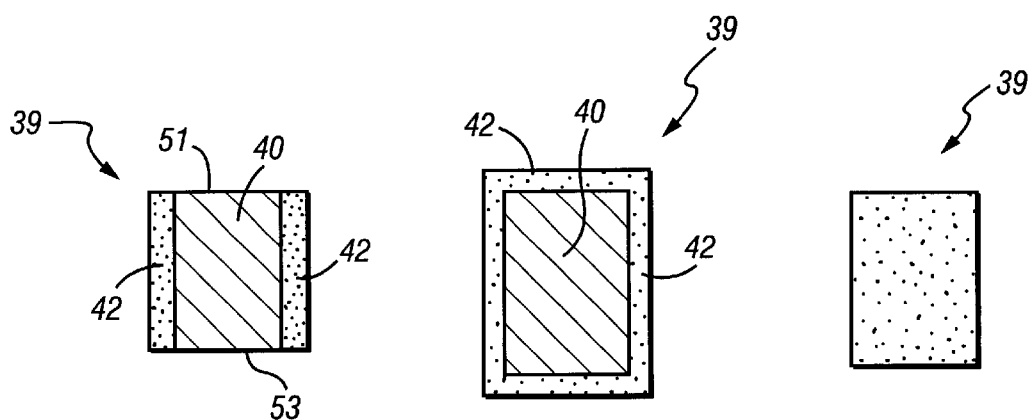
FIG. 5 is a side cross sectional view of a two-piece cylindrically or rectangularly spacer/pillar that may be used in either the FIG. 3 or FIG. 4 embodiment of this invention, the spacer/pillar of this embodiment functioning as both a spacer and a getter.
FIG. 6 is a side cross sectional view of another two-piece spacer/pillar that may be used in either the FIG. 3 or FIG. 4 embodiment of this invention, the spacer/pillar of this embodiment functioning as both a spacer and a getter.
FIG. 7 is a side cross sectional view of a one piece spacer/pillar that may be used in either the FIG. 3 or FIG. 4 embodiment of this invention, the spacer/pillar of this embodiment functioning as both a spacer and a getter, and in some embodiments consisting essentially of getter material.

FIG. 5 is a cross sectional view of cylindrically or rectangularly shaped spacer/pillar 39 which may be used as any or all of the spacers 39 in the spacer array of either of the FIGS. 3–4 embodiments. Optionally, some of the pillars in the array may be getter inclusive while the remaining pillars need not be getter inclusive. As shown, core 40 is coated on its vertically extending periphery (or lengthwise periphery) or sides with getter inclusive coating 42. Coating 42 may consist essentially of getter material, or alternatively may include getter material as well as other material. In this embodiment, the upper and lower surfaces 51, 53 of the core are not coated with getter coating 42. An example of this embodiment would be where a wafer core was coated with the getter coating and thereafter cut up into a plurality of pieces.

FIG. 6 is a cross sectional view of a cylindrically or rectangularly shaped spacer/pillar 39 according to another embodiment of this invention. This spacer 39 may be used as any or all of the spacers 39 in the array of either the FIG. 3 or FIG. 4 embodiment of this invention. In the FIG. 6 embodiment, all exterior surfaces of core 40 are coated with getter inclusive coating 42. In each of the FIG. 5 and FIG. 6 embodiments, getter coating 42 may have a thickness at a portion thereof of less than or equal to about 25 $\mu$m, more preferably less than about 5 $\mu$m, and most preferably less than or equal to about 1 $\mu$m. In alternative embodiments of this invention, a seed of pillar core material may be provided of any size, and a getter coating 42 may be grown thereon to whatever thickness is necessary so that the overall resulting pillar 39 is of a satisfactory size (i.e. height, thickness, etc.)

FIG. 7 is a cross sectional view of a cylindrically or rectangularly shaped one-piece spacer/pillar 39 according to yet another embodiment of this invention. This spacer 39 may be used as any or all of the spacers 39 in the array of either the FIG. 3 or FIG. 4 embodiment of this invention. In the FIG. 7 embodiment, the entire spacer 39 is of a material that includes or is of a substantially pure elemental metallic getter material or alloy thereof. For example, spacer 39 in this embodiment may be of or include any of the materials listed above that may be used to form getter coating 42 in other embodiments. Thus, spacer 39 in this embodiments may be formed of a getter material such as, but not limited to, Zr—Al, Zr—Fe, Zr—V—Ti—Fe, Zr—V—Fe, Ti alloy, Nb alloy, other Zr alloys, Ta alloy, V alloy, Zr—Al, Zr—V, Zr—Ni, or Zr—Mn—Fe. It is noted that when the entire spacer/pillar 39 is formed of a getter inclusive material as in the FIG. 7 embodiment, the material is to be selected of a suitable low thermal conduction material of sufficient compressive strength to perform its function of supporting and spacing the opposing glass sheets from one another.

While the one-piece FIG. 7 embodiment and the two-piece embodiments of FIGS. 5–6 illustrate and describe approximately cylindrically (the top and bottom of the cylindrical pillar supporting the opposing glass sheets) or rectangularly shaped spacers 39, other shapes may instead by taken by spacers in different embodiments of this invention. For example, spacers 39 in other one or two piece embodiments of this invention may be approximately square shaped, approximately round shaped, approximately oval shaped, approximately spherical shaped, approximately hemispherical shaped, shaped as a multi-faceted spherical member, approximately trapezoidal shaped, or shaped in any way illustrated in U.S. Pat. No. 5,891,536 the disclosure of which is incorporated herein by reference.

Getter materials described herein (e.g. see coating 42 and the core of the FIG. 7 embodiment) act by chemisorption of gases such as carbon monoxide, carbon dioxide, water, molecular oxygen, and/or molecular hydrogen, or other gases, for example. Most of these gases remain retained near, at or on the surface of the getter material at certain temperatures (i.e. adsorbed). However, some materials may dissociate and diffuse into the getter material as a function of temperature. These non-evaporable getters are used to create and maintain high vacuum conditions within space 37. In other words, these getters remove a substantial amount of any outgassing the might compromise the integrity of the vacuum in space 37, by adsorbing gas(es) present in space 37 (e.g. outgassing may occur during sealing of the pump out tube). Non-evaporable getters used herein provide gettering capability without having to evaporate substantial material. Substantial getter surface area of getter material in space 37 is provided by having getter material on surfaces of spacers 39. In certain embodiments (e.g. two-piece FIGS. 5–6 embodiments), substantially pure elemental metal getter starting materials are used and the alloying of the materials together in a single melting during spacer formation may decrease manufacturing costs and provide high quality getter alloy formation.

For purposes of example only, without limitation, certain steps of an exemplary procedure for making a vacuum IG unit 31 with two-piece getter spacers 39 according to an embodiment of this invention are described below. To begin, substrates 33 and 35 are provided (e.g. float glass). A diamond bit scriber is used and manipulated around an outer peripheral area of substrate 33 to form continuous peripheral groove shown in FIG. 4. After the groove is formed, coating 36 is deposited and formed on substrate 33 over the groove so as to extend outwardly from the edges thereof.

Figure 8A:
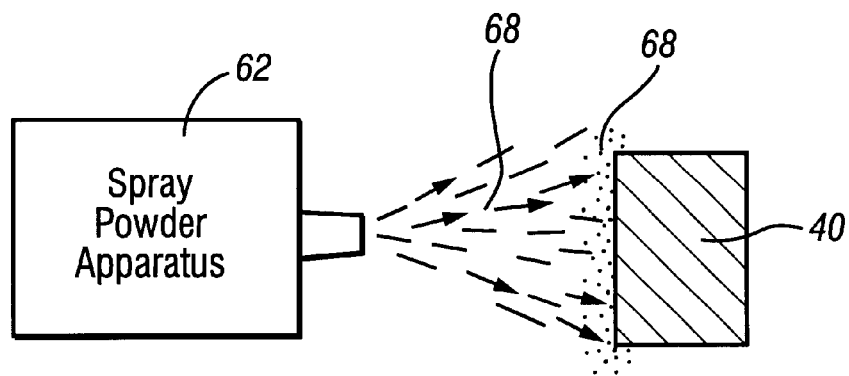
FIG. 8(a) is a schematic diagram of an apparatus spraying getter powder material onto the outside of a humidified spacer/pillar core according to an embodiment of this invention.
Figure 8B:
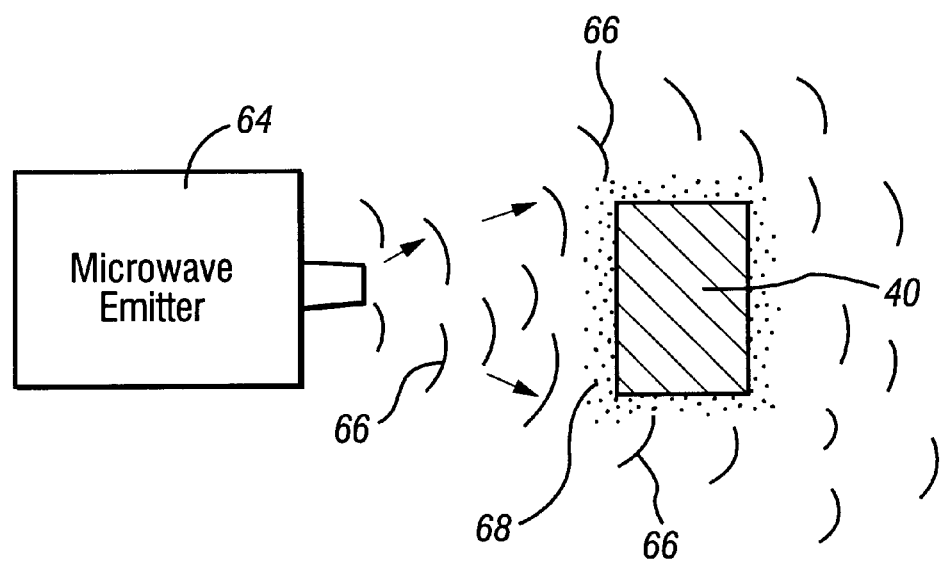
FIG. 8(b) is a schematic diagram of an apparatus melting getter powder on a spacer/pillar core using microwaves, so that the getter material diffuses into or adheres to the core.

Referring to FIGS. 8(a) and 8(b), the pillar may be formed as follows in certain embodiments. Core 40 is provided and humidified. Apparatus 62 sprays elemental metal getter powder (of any getter material listed above) 68 of sub-micron size toward core 40, with the powder sticking to the humidified core. For example, when Zr—V—Fe getter material is used, a homogeneous mixture of each of these elemental metals is sprayed onto the humidified core. After the powder 68 contacts core 40, apparatus 64 emits microwaves 66 toward the coated core as shown in FIG. 8(b) in an inert atmosphere or in a vacuum chamber. Powder metal 68 absorbs the microwave energy thereby melting and diffusing into the surface of core 40 to provide a non-evaporable getter coating 42 on the core to form spacer/pillar 39.

Getter spacers/pillars 39 are then deposited in an array on substrate 33. A slurry of indium inclusive material is placed so as to be at least partially within the groove in the area where the hermetic seal is to be formed. Upper substrate 35 is then laid over and placed on bottom substrate 33 with the seal material either solely or partly maintaining spacing between the substrates. The upper sheet is then pressed down toward the lower sheet 33 (or vice versa, or both pressed together) so that the spacers support the sheets and define space 37.

If a pump out tube is to be used to evacuate space 37, then the unit (e.g. including the two substrates, getter pillars 39, and seal material therebetween) is heated to a temperature of about 100–500 degrees C. (e.g. about 450 degrees C. for up to about 8–9 hours, and then reduced to about 280–300 degrees C. for up to about one hour during pump out, for solder glass lead composite peripheral seals) to degas the glass substrates, activate the getter, and deform the seal material to form hermetic seal 43.

However, in alternative embodiments, the pump out tube may be eliminated. In such embodiments, each substrate 33, 35 is placed in a degassing chamber prior to the seal material and pillars being laid down and prior to being placed on one another. This chamber is heated to from about 100–300 degrees C., preferably from about 125 to 300 C., for about 30–90 minutes to get water vapor and other gas(es) out of the glass substrates (e.g. for any of the above identified indium inclusive peripheral seals). Then, the glass substrates are taken to a vacuum chamber having a pressure desired to be the final pressure in space 37. In this vacuum chamber, sealing material is laid down or deposited as are getter pillars 39 on substrate 33, and the upper substrate 35 is then laid on the lower one 33 with the pillars and slurry material therebetween. The temperature in the vacuum chamber is set to less than about 300° C. for the slurry deformation and getter activation, preferably less than or equal to about 200° C. and most preferably less than or equal to about 150° C. When top substrate 35 is pressed downward toward the lower substrate (or vice versa) the slurry or wire deforms (e.g. flattens or partially flattens) between the substrates at this temperature into hermetic seal 43.

Afterwards, the vacuum IG unit with hermetic seal 43 and activated getters are taken out of the evacuated oven area and allowed to cool. Optionally, before being taken to an atmospheric area, the center of the glazing may be blasted with room temperature air from both sides to cool the center faster than edge areas.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A thermally insulating glass panel comprising:
    first and second spaced apart glass substrates defining a low pressure space therebetween;
    a seal interconnecting said first and second spaced apart glass substrates so as to hermetically seal said low pressure space between said substrates; and
    an array of getter inclusive spacers disposed in said low pressure space for maintaining separation of said first and second glass substrates.

2. The thermally insulating glass panel of claim 1, wherein at least one of said spacers includes a core and a getter coating provided on at least one portion of said core.

3. The thermally insulating glass panel of claim 2, wherein said getter coating is metallic and is provided on all substantially all surfaces of said core.

4. The thermally insulating glass panel of claim 2, wherein said getter coating is metallic and comprises a material selected from: Zr—Al alloy; Zr—Fe alloy; Zr—V—Ti—Fe alloy; Zr—V—Fe alloy; Zr—V alloy; Zr—Ni alloy; Zr—Mn—Fe alloy; Ti inclusive alloy; Zr inclusive alloy; V inclusive alloy; Nb inclusive alloy; or Ta inclusive alloy.

5. The thermally insulating glass panel of claim 2, wherein said getter coating has a thickness in at least one substantial area thereof of less than or equal to about 25 μm.

6. The thermally insulating glass panel of claim 1, wherein said spacer is shaped in the form of one of the group consisting of: approximately cylindrical in shape; approximately square in shape; approximately oval in shape; and approximately spherical in shape.

7. The thermally insulating glass panel of claim 1, wherein said spacer is a metallic one-piece spacer.

8. The thermally insulating glass panel of claim 7, wherein said spacer comprises a material selected from the group consisting of: Zr—Al alloy; Zr—Fe alloy; Zr—V—Ti—Fe alloy; Zr—V—Fe alloy; Zr—V alloy; Zr—Ni alloy; Zr—Mn—Fe alloy; Ti inclusive alloy; Zr inclusive alloy; V inclusive alloy; Nb inclusive alloy; and Ta inclusive alloy.

9. The thermally insulating glass panel of claim 1, wherein said seal includes indium.

10. An insulating glass (IG) unit comprising:
    first and second glass substrates spaced from one another to define a low pressure space therebetween, said low pressure space having a pressure less than atmospheric pressure;
    a plurality of spacers or pillars disposed in said low pressure space between said first and second substrates to space said glass substrates from one another; and
    wherein a plurality of said spacers comprise a getter material.

11. The insulating glass unit of claim 10, wherein a plurality of said spacers include getter material for absorbing substantial amounts of gas located in said low pressure space, and said getter material being selected from the group consisting of: Zr—Al alloy; Zr—Fe alloy; Zr—V—Ti—Fe alloy; Zr—V—Fe alloy; Zr—V alloy; Zr—Ni alloy; Zr—Mn—Fe alloy; Ti inclusive alloy; Zr inclusive alloy; V inclusive alloy; Nb inclusive alloy; and Ta inclusive alloy.

12. The insulating glass unit of claim 10, wherein at least one of said spacers includes a core and a getter coating provided on at least one portion of said core.

13. The insulating glass unit of claim 12, wherein said getter coating is metallic and is provided on all surfaces of said core.

14. The insulating glass unit of claim 10, wherein said at least one spacer is a metallic one-piece spacer consisting essentially of a getter inclusive material.

15. A method of making a thermally insulating product, the method comprising the steps of:
    providing first and second substrates;
    providing at least one spacer core;
    providing a getter powder on the spacer core;
    the getter powder absorbing microwave energy and diffusing into a surface of the core to form a getter spacer including a getter coating; and positioning the getter spacer between the first and second substrates.

16. The method of claim 15, further comprising the steps of:

forming a low pressure space having a pressure less than atmospheric pressure between the first and second substrates;

positioning the getter spacer in the low pressure space; and the getter adsorbing gas located within the low pressure space to help maintain integrity of vacuum in the low pressure space.

17. The method of claim 16, wherein said step of providing a getter powder on the spacer core includes providing a metallic powder on the core where the powder comprises a material selected from the group consisting of: Ti inclusive alloy; Zr inclusive alloy; V inclusive alloy; Nb inclusive alloy; and Ta inclusive alloy.

18. The method of claim 16, further comprising the step of humidifying the core prior to providing the getter powder thereon.

19. A method of maintaining vacuum in a low pressure space between first and second substrates, said method comprising:

providing a plurality of getter spacers in the low pressure space between the first and second substrates to support the substrates and space the substrates from one another; and the spacers adsorbing gas present in the low pressure space.

20. The panel of claim 1, wherein all spacers located between the substrates comprise getter material.

* * * * *